United States Patent Office 3,169,951
Patented Feb. 16, 1965

3,169,951
CHROMIUM-CONTAINING AZO DYESTUFFS
Arthur Buehler, Rheinfelden, Aargau, Switzerland, and Gerhard Back, Lorrach, Baden, Germany, assignors to Ciba Limited, Basel, Switzerland, a company of Switzerland
No Drawing. Filed Oct. 7, 1963, Ser. No. 314,522
Claims priority, application Switzerland, Oct. 10, 1962, 11,875/62; Sept. 4, 1963, 10,927/63
9 Claims. (Cl. 260—145)

The present invention is based on the observation that valuable new chromium-containing azo dyestuffs that contain one atom of chromium bound in complex union with two molecules of different monoazo dyestuffs are obtained when a monoazo dyestuff of the formula

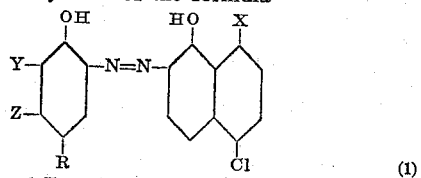

in which R, Y and Z each represents a hydrogen atom or a chlorine atom or a nitro group, but at most R and Y simultaneously represent a nitro group, and R may also represent a low-molecular alkyl or alkoxy group, and X represents a hydrogen atom or a chlorine atom, is reacted in a molar ratio of about 1:1 with a complex chromium compound that contains one chromium atom bound in complex union with a molecule of a monoazo dyestuff of the formula

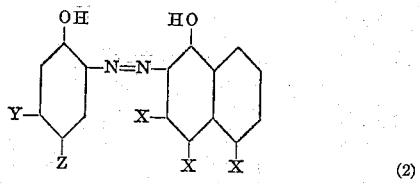

in which one X represents a sulphonic acid group and the other two X's represent hydrogen atoms, Y represents a hydrogen atom or a nitro group, and Z represents a hydrogen atom or a chlorine atom or a nitro group or a low-molecular alkyl or alkoxy group, and in which Y and Z must be different from each other.

The monoazo dyestuffs of the Formula 1 used in the present process can be prepared in known manner by coupling 5-chloro- or 5:8-dichloro-1-hydroxynaphthalene with orthohydroxy-diazo compounds prepared from amines of the formula

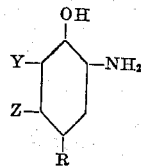

in which Y, Z and R have the meanings ascribed to them in Formula 1, in a weakly acid to alkaline medium.

As examples of such amines there may be mentioned 2-amino-1-hydroxybenzene
4-methyl- or 4-methoxy-2-amino-1-hydroxybenzene,
5-chloro-2-amino-1-hydroxybenzene,
4:6-dichloro-2-amino-1-hydroxybenzene,
3:4:6-trichloro-2-amino-1-hydroxybenzene,
4-chloro-5- or -6-nitro-2-amino-1-hydroxybenzene,
6-nitro-4-methyl-2-amino-1-hydroxybenzene,
5-chloro-4-methoxy-2-amino-1-hydroxybenzene,
4-nitro-6-chloro-2-amino-1-hydroxybenzene,
4:6-dinitro-2-amino-1-hydroxybenzene, especially
4- or 5-nitro-2-amino-1-hydroxybenzene, and
4-chloro-2-amino-1-hydroxybenzene.

The monoazo dyestuffs of the Formula 2 can likewise be prepared in known manner by coupling 1-hydroxynaphthalene-3-, -4- or -5-sulphonic acid with diazo compounds prepared, for example, from 4-chloro, 4-methyl-, 4-methoxy- or 4-nitro-2-aminophenol, 5-nitro-2-aminophenol or 4-chloro-, 4-methyl- or 4-methoxy-5-nitro-2-aminophenol. Their conversion into 1:1 chromium complexes may be performed by conventional known methods, for example, by reacting them in an acid medium at boiling temperature or, if necessary, at a temperature above 100° C. with an excess of a salt of trivalent chromium, for example, chromium formate, chromium sulphate or chromium fluoride. It is generally of advantage to carry out the metallisation in known manner in an aqueous medium, if necessary, in the presence of an organic solvent, for example, alcohol or formamide.

As is known, the 1:1 metal complexes of ortho-ortho'-dihydroxy-monoazo dyestuffs can be prepared not only from the ortho:ortho'-dihydroxy-monoazo dyestuffs themselves, but also from the corresponding ortho-alkoxy-ortho'-hydroxy-monoazo dyestuffs. Accordingly, for the preparation of the chromium-containing dyestuffs used as starting materials in the present process there can be used, instead of the ortho-hydroxydiazo compound of the Formula 2, the corresponding ortho-alkoxydiazo compound, especially the methoxy compound.

In the present process it is generally of advantage not to dry the starting dyestuffs after their preparation and precipitation, but to use them in the form of a moist paste for further processing.

The reaction of the 1:1 chromium complexes with the metal-free dyestuffs is advantageously carried out in a neutral to slightly alkaline aqueous medium in an open or closed vessel at room temperature or at an elevated temperature, for example, at a temperature between 50 and 120° C. The addition of solvents, for example, alcohol or formamide, can assist the reaction in some cases. It is generally of advantage to react equivalent proportions of chromium-containing 1:1 complexes and metal-free dyestuffs, the molar ratio between metal-free dyestuffs and 1:1 complex advantageously being at least 0.85:1 and 1:0.85; an excess of metal-containing dyestuff is generally less disadvantageous than an excess of metal-free dyestuff. The closer this ratio is to 1:1, the more advantageous is the result.

The new chromium-containing mixed complexes obtainable by the present process are suitable for dyeing and printing a very wide variety of materials, but more especially for dyeing animal materials, for example, silk, leather and more especially wool. They are also suitable for dyeing and printing synthetic fibers made from polyamides, polyurethanes and polyacrylonitrile, and also fibre mixtures, for example, wool/polyamide mixtures. They are mainly suitable for application from weakly alkaline, neutral or weakly acid bath, for example, an acetic acid bath. The dyeings so obtained are uniform and possess a good fastness to light, to washing, to milling, to decatising and to carbonising. They are also distinguished by their favourable appearance in artificial light.

The following example illustrates the invention. Unless otherwise stated, the parts and percentages are by weight.

Example 44.1 parts of the 1:1 chromium complex of a dyestuff prepared from diazotised 5-nitro-2-amino-1-hydroxybenzene and 1-hydroxynaphtahalene-5-sulphonic acid and 36.75 parts of a dyestuff prepared from diazotised 4-chloro-2-amino-1-hydroxybenzene and 5:8-dichloro-1-hydroxynaphthalene are stirred in 5000 parts of hot water and the mixture is then neutralised. 6.0 parts of sodium hydroxide are added, and the mixture is stirred at 95 to 98° C. until both starting dyestuffs have practically disappeared. The dyestuff is then precipitated out of the resulting blue-black solution by the addition of sodium chloride, filtered off and dried. It constitutes a blue-black powder that dissolves in water to give a blue solution and in concentrated sulphuric acid to give a violet-grey solution. It dyes wool dark blue tints possessing good properties of fastness when applied from a weakly acid bath.

In the following table there are listed a number of other chromium-containing dyestuffs (1:2 complexes) that are obtained when the chromium-free dyestuffs listed in column II are reacted with the 1:1 chromium complex compounds of the corresponding monoazo dyestuffs listed in column I in a molar ratio of 1:1. Column III indicates the tints obtained on wool with the dyestuffs listed.

| I | II | III |
|---|---|---|
| [structure] | [structure] | Dark blue. |
| [structure] | [structure] | Do. |
| [structure] | [structure] | Do. |
| [structure] | [structure] | Do. |
| [structure] | [structure] | Reddish blue. |
| [structure] | [structure] | Blue. |
| [structure] | [structure] | Do. |
| [structure] | [structure] | Do. |

| I | II | III |
|---|---|---|
| 2-hydroxy-4-nitrophenyl → 1-hydroxy-4-sulfonaphthyl | 2-hydroxy-5-nitrophenyl → 1-hydroxy-2,4-dichloronaphthyl | Bluish grey. |
| 2-hydroxy-5-nitrophenyl → 1-hydroxy-4-sulfonaphthyl | 2-hydroxy-5-chlorophenyl → 1-hydroxy-2,4-dichloronaphthyl | Dull violet. |
| 2-hydroxy-5-nitrophenyl → 1-hydroxy-4-sulfonaphthyl | 2-hydroxy-4-nitrophenyl → 1-hydroxy-4-chloronaphthyl | Grey-violet. |
| 2-hydroxy-3-chloro-5-nitrophenyl → 1-hydroxy-4-sulfonaphthyl | 2-hydroxy-5-chlorophenyl → 1-hydroxy-2,4-dichloronaphthyl | Reddish blue. |
| 2-hydroxy-3-chloro-5-nitrophenyl → 1-hydroxy-4-sulfonaphthyl | 2-hydroxy-5-nitrophenyl → 1-hydroxy-4-chloronaphthyl | Dark blue. |
| 2-hydroxy-5-nitrophenyl → 1-hydroxy-4-sulfonaphthyl | 2-hydroxy-3,5-dichlorophenyl → 1-hydroxy-2,4-dichloronaphthyl | Blue. |
| 2-hydroxy-5-nitrophenyl → 1-hydroxy-4-sulfonaphthyl | 2-hydroxy-5-nitrophenyl → 1-hydroxy-4-chloronaphthyl | Do. |
| 2-hydroxy-5-nitrophenyl → 1-hydroxy-4-sulfonaphthyl | 2-hydroxy-5-chlorophenyl → 1-hydroxy-2,4-dichloronaphthyl | Grey-violet. |
| 2-hydroxy-5-nitrophenyl → 1-hydroxy-4-sulfonaphthyl | 2-hydroxy-5-nitrophenyl → 1-hydroxy-4-chloronaphthyl | Reddish grey. |
| 2-hydroxy-5-chlorophenyl → 1-hydroxy-4-sulfonaphthyl | 2-hydroxy-5-chlorophenyl → 1-hydroxy-2,4-dichloronaphthyl | Blue-violet. |

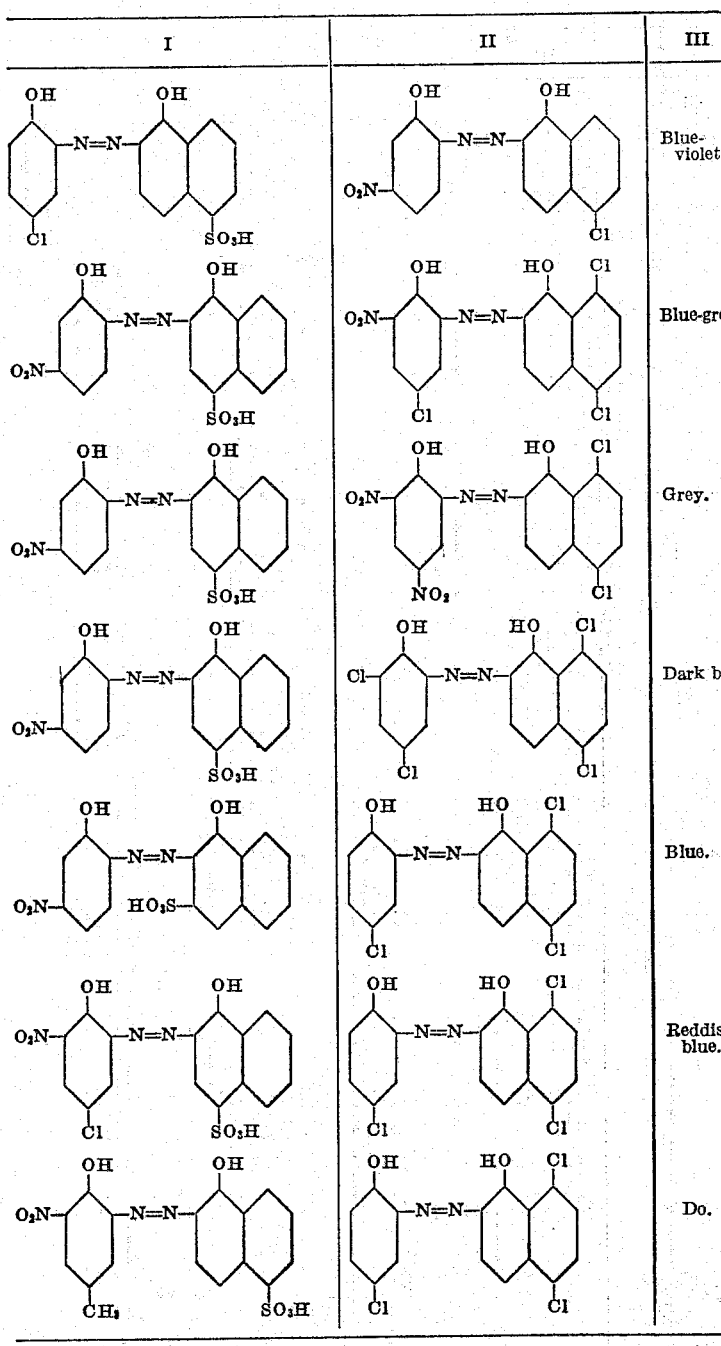

What is claimed is:

1. A complex chromium compound containing one atom of chromium in complex union with two monoazo-dyestuff molecules of the formulae

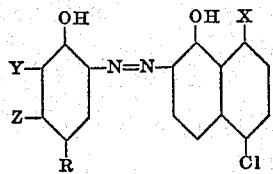

and

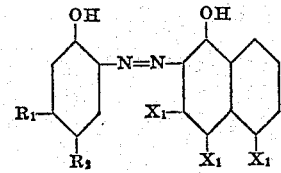

wherein Y and Z each represent a member selected from the group consisting of hydrogen, chlorine and nitro, R is a member selected from the group consisting of hydrogen, chlorine, nitro, at most Y and R representing simultaneously nitro, X is a member selected from the group consisting of hydrogen and chlorine, $R_1$ is a member selected from the group consisting of hydrogen and nitro, $R_2$ is a member selected from the group consisting of hydrogen, chlorine, nitro, methyl and methoxy, $R_1$ and $R_2$ being different from each other, and one $X_1$ is sulfonic acid and the other two $X_1$'s hydrogen.

2. A complex chromium compound containing one atom of chromium in complex union with two monoazo-dyestuff molecules of the formulae

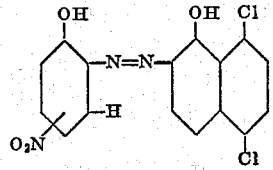

and

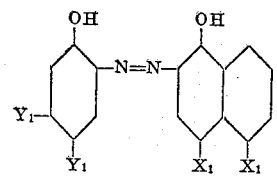

wherein one $X_1$ is sulfonic acid and the other $X_1$ is hydrohydrogen, one $Y_1$ is nitro and the other $Y_1$ is hydrogen.

3. The complex chromium compound containing one atom of chromium in complex union with two monoazodyestuff molecules of the formulae

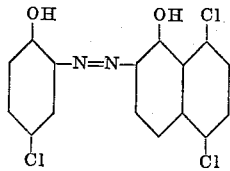

and

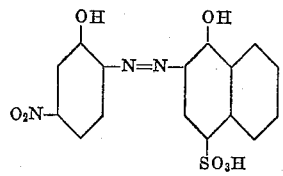

4. The complex chromium compound containing one atom of chromium in complex union with two monoazodyestuff molecules of the formulae

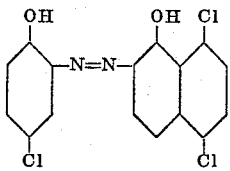

and

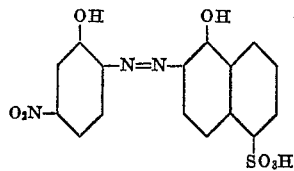

5. The complex chromium compound containing one atom of chromium in complex union with two monoazodyestuff molecules of the formulae

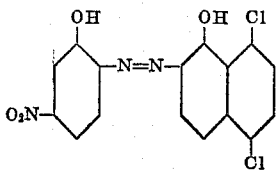

and

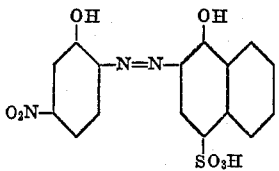

6. The complex chromium compound containing one atom of chromium in complex union with two monoazodyestuff molecules of the formulae

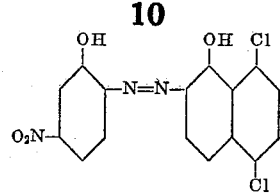

and

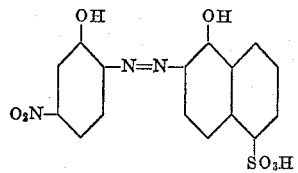

7. The complex chromium compound containing one atom of chromium in complex union with two monoazodyestuff molecules of the formulae

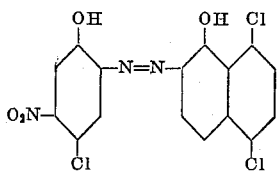

and

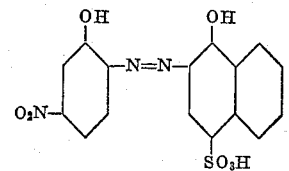

8. The complex chromium compound containing one atom of chromium in complex union with two monoazodyestuff molecules of the formulae

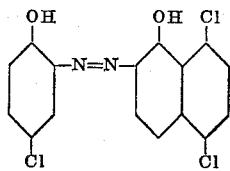

and

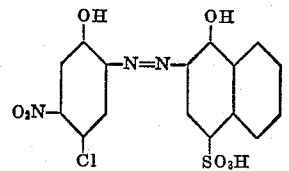

9. The complex chromium compound containing one atom of chromium in complex union with two monoazodyestuff molecules of the formulae

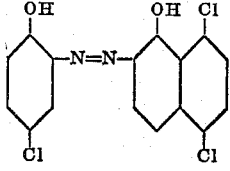

and

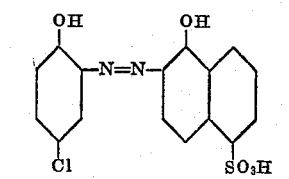

No references cited.

UNITED STATES PATENT OFFICE
CERTIFICATE OF CORRECTION

Patent No. 3,169,951                                   February 16, 1965

Arthur Buehler et al.

It is hereby certified that error appears in the above numbered patent requiring correction and that the said Letters Patent should read as corrected below.

Column 9, lines 45 to 52, the left-hand portion of the formula should appear as shown below insted of as in the patent:

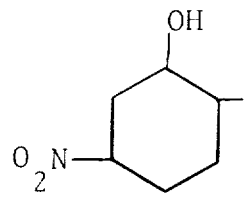

Signed and sealed this 27th day of July 1965.
(SEAL)
Attest:

ERNEST W. SWIDER                                 EDWARD J. BRENNER
Attesting Officer                                     Commissioner of Patents